United States Patent
Marx et al.

(10) Patent No.: US 10,329,390 B2
(45) Date of Patent: Jun. 25, 2019

(54) POLYURETHANE NANOCOMPOSITES

(71) Applicant: 3M INNOVATIVE PROPERTIES COMPANY, St. Paul, MN (US)

(72) Inventors: Ryan E. Marx, Rosemount, MN (US); William J. Schultz, North Oaks, MN (US); Wendy L. Thompson, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 5 days.

(21) Appl. No.: 15/367,414

(22) Filed: Dec. 2, 2016

(65) Prior Publication Data

US 2017/0081483 A1 Mar. 23, 2017

Related U.S. Application Data

(62) Division of application No. 12/978,699, filed on Dec. 27, 2010, now Pat. No. 9,540,479.

(60) Provisional application No. 61/290,754, filed on Dec. 29, 2009.

(51) Int. Cl.

| | |
|---|---|
| *C08J 5/00* | (2006.01) |
| *B82Y 30/00* | (2011.01) |
| *C08G 18/32* | (2006.01) |
| *C08G 18/42* | (2006.01) |
| *C08G 18/48* | (2006.01) |
| *C08G 18/66* | (2006.01) |
| *C08G 18/71* | (2006.01) |
| *C08G 18/75* | (2006.01) |
| *C09D 175/04* | (2006.01) |
| *B05D 3/06* | (2006.01) |
| *C08G 18/24* | (2006.01) |
| *C08K 3/36* | (2006.01) |
| *C08K 7/00* | (2006.01) |
| *C08K 9/04* | (2006.01) |

(52) U.S. Cl.
CPC .............. *C08J 5/005* (2013.01); *B05D 3/06* (2013.01); *B82Y 30/00* (2013.01); *C08G 18/242* (2013.01); *C08G 18/3206* (2013.01); *C08G 18/4277* (2013.01); *C08G 18/4854* (2013.01); *C08G 18/6674* (2013.01); *C08G 18/718* (2013.01); *C08G 18/755* (2013.01); *C09D 175/04* (2013.01); *C08J 2375/04* (2013.01); *C08K 3/36* (2013.01); *C08K 7/00* (2013.01); *C08K 9/04* (2013.01); *Y10T 428/28* (2015.01)

(58) Field of Classification Search
None
See application file for complete search history.

(56) References Cited

U.S. PATENT DOCUMENTS

| | | |
|---|---|---|
| 634,174 A | 10/1899 | Lawson |
| 5,484,832 A | 1/1996 | Garrett |
| 5,648,407 A | 7/1997 | Goetz et al. |
| 5,811,472 A | 9/1998 | Patel |
| 5,859,118 A | 1/1999 | Roesler et al. |
| 5,932,652 A | 8/1999 | Roesler et al. |
| 5,936,006 A | 8/1999 | Rheinberger et al. |
| 6,306,502 B1 | 10/2001 | Fukushima et al. |
| 6,353,037 B1 | 3/2002 | Thunhorst et al. |
| 6,462,100 B1 | 10/2002 | Thunhorst et al. |
| 6,586,483 B2 | 7/2003 | Kolb et al. |
| 7,326,448 B2 | 2/2008 | Jones et al. |
| 7,427,438 B2 | 9/2008 | Jones et al. |
| 7,598,315 B2 | 10/2009 | Lubnin |
| 8,088,880 B2 | 1/2012 | Nennemann et al. |
| 2002/0149659 A1* | 10/2002 | Wu ............ C09D 11/101 347/102 |
| 2003/0099895 A1* | 5/2003 | Barthel ........ C09C 1/3081 430/118.3 |
| 2004/0096663 A1 | 5/2004 | Yamaguchi et al. |
| 2005/0027040 A1 | 2/2005 | Nelson et al. |

(Continued)

FOREIGN PATENT DOCUMENTS

| | | |
|---|---|---|
| EP | 0 832 947 | 4/1998 |
| JP | S61-283612 | 12/1986 |

(Continued)

OTHER PUBLICATIONS

Shokuhi Rad, A., and Ardimand, M.; "Use and Effect of Si/Silica Nano Materials in Polyurethane's Structure", Asian Journal of Chemistry; vol. 21, No. 5, (2009), pp. 3313-3333.

(Continued)

*Primary Examiner* — William P Fletcher, III
(74) *Attorney, Agent, or Firm* — Philip P. Soo

(57) ABSTRACT

Polyurethane nanocomposites are provided which include a polyurethane and surface modified silica nanoparticles covalently bound into the polyurethane. High loadings in excess of 30% may be achieved. In some embodiments, the silica nanoparticles are covalently bound to the polyurethane polymer through a linkage derived from a surface-modifying compound comprising a silane functional group and a polyol segment. In some embodiments the polyurethane nanocomposite may be provided as a tape or film. In addition, precursors for a polyurethane nanocomposites are provided comprising: a first polyol and surface modified silica nanoparticles dispersed within the first polyol. In some embodiments, the silica nanoparticles are surface-modified by reaction with a surface-modifying compound comprising a silane functional group and a polyol segment derived from a second polyol, which may be the same or different from the first polyol.

19 Claims, No Drawings

(56) References Cited

U.S. PATENT DOCUMENTS

| | | | |
|---|---|---|---|
| 2005/0043425 A1 | 2/2005 | Beck et al. | |
| 2005/0239939 A1 | 10/2005 | Zheng et al. | |
| 2006/0135636 A1 | 6/2006 | Zhu et al. | |
| 2006/0216508 A1 | 9/2006 | Denisyuk et al. | |
| 2007/0116976 A1 | 5/2007 | Tan et al. | |
| 2007/0197709 A1 | 8/2007 | Kim et al. | |
| 2007/0275042 A1* | 11/2007 | Anderson | A61L 15/26 424/445 |
| 2007/0292623 A1* | 12/2007 | Lin | C09D 1/00 427/407.1 |
| 2008/0028983 A1 | 2/2008 | Briehn | |
| 2008/0119601 A1 | 5/2008 | Nennemann et al. | |
| 2008/0160289 A1* | 7/2008 | Lin | B82Y 30/00 428/327 |
| 2008/0188581 A1 | 8/2008 | Lee et al. | |
| 2008/0207842 A1* | 8/2008 | Barthel | C08G 18/61 525/418 |
| 2009/0306277 A1* | 12/2009 | Goenner | C09D 167/06 524/556 |

FOREIGN PATENT DOCUMENTS

| | | |
|---|---|---|
| JP | 2005-220322 | 8/2005 |
| JP | 2005-226052 | 8/2005 |
| JP | 2005-226060 | 8/2005 |
| JP | 2005-232197 | 9/2005 |
| WO | WO 2006/060174 | 6/2006 |

OTHER PUBLICATIONS

Lee, Sung-Il, Hahn, Y. B., Nahm, K. S., and Lee, Youn-Sik; "Synthesis of Polyether-Based Polyurethane-Silica Nanocomposites With High Elongation Property"; Polymers for Advanced Technologies; vol. 16: (2005), pp. 328-331.

Torro-Palau, A. M, Fernandez-Garcia, J. C., Orgiles-Barcelo, A. C., Martin-Martinez, J. M.; "Characterization of Polyurethanes Containing Different Silicas"; International Journal of Adhesion & Adhesives; vol. 21; (2001), pp. 1-9.

Zhou, Shu-Xue, Wu, Li-Min, Sun, Jian, and Shen, Wei-Dian; "Effect of Nanosilica on the Properties of Polyester-Based Polyurethane", Journal of Applied Polymer Science; vol. 88, (2003), pp. 189-193.

Chen, Y., Zhou, S., Yang, H., Wu, L.; "Structure and Properties of Polyurethane/Nanosilica Composites", Journal of Applied Polymer Science; vol. 95, (2005), pp. 1032-1039.

Seo, J. W., Kim, B. K., "Preparations and Properties of Waterborne Polyurethane/Nanosilica Composites", Polymer Bulletin; 54, (2005), pp. 123-128.

Zhu, Y., Sun, D., "Preparation of Silicon Dioxide/Polyurethane Nanocomposites by a Sol-Gel Process", Journal of Applied Polymer Science; vol. 92, (2004), pp. 2013-2016.

Javni, I., Zhang, W., Karajkov, V., and Petrovic, Z. S.; "Effect of Nano-and Micro-Silica Fillers on Polyurethane Foam Properties", Journal of Cellular Plastics, vol. 38, May 2002, pp. 229-239.

Form PCT/ISA/210, International Application No. PCT/US2010/062122, International Filing Date: Dec. 27, 2010. (4 pages).

* cited by examiner

POLYURETHANE NANOCOMPOSITES

CROSS REFERENCE TO RELATED APPLICATION

This application is a divisional of U.S. application Ser. No. 12/978,699, filed Dec. 27, 2010, now pending, which claims the benefit of U.S. Provisional Patent Application No. 61/290,754, filed Dec. 29, 2009, the disclosure of which is incorporated by reference herein in its entirety.

FIELD OF THE DISCLOSURE

This disclosure relates to polyurethane nanocomposites which include a polyurethane and surface modified silica nanoparticles are covalently bound into the elastomeric polyurethane.

SUMMARY OF THE DISCLOSURE

Briefly, the present disclosure provides a polyurethane nanocomposite comprising: a) a polyurethane polymer, and b) surface modified silica nanoparticles dispersed within and covalently bound to the polyurethane polymer. Typically, the polyurethane nanocomposite according to claim 1 having a silica content of greater than 12% by weight, more typically greater than 18% by weight, and more typically greater than 30% by weight. In some embodiments, the silica nanoparticles are covalently bound to the polyurethane polymer through a linkage derived from a surface-modifying compound comprising a silane functional group and a polyol segment. Typically, the polyol segment has a molecular weight of at least 500. In some embodiments, the surface modified silica nanoparticles have a number average particle size of between 5 and 500 nanometers (nm) and optionally exhibit a multimodal particle size distribution. In some embodiments, the surface modified silica nanoparticles are also surface-modified by reaction with a second surface-modifying compound comprising a silane functional group and having a molecular weight of less than 800, more typically less than 500, and more typically less than 350. Typically the second surface-modifying compound comprises no polyol segment. In some embodiments, the polyurethane comprises an acrylate component capable of radiation-induced crosslinking. In some embodiments the polyurethane nanocomposite may be provided as a tape or film.

In another aspect, the present disclosure provides a precursor for a polyurethane nanocomposite comprising: a) a first polyol, and b) surface modified silica nanoparticles dispersed within the first polyol. Typically, the precursor for a polyurethane nanocomposite has a silica content of greater than 18% by weight, more typically greater than 30% by weight, and more typically greater than 50% by weight. In some embodiments, the silica nanoparticles are surface-modified by reaction with a surface-modifying compound comprising a silane functional group and a polyol segment derived from a second polyol. Typically, the polyol segment has a molecular weight of at least 500 and more typically at least 800. In some embodiments, at least one second polyol is the same polyol as at least one first polyol. In some embodiments, the second polyol is essentially the same polyol as the first polyol. In some embodiments, the surface modified silica nanoparticles have a number average particle size of between 5 and 500 nanometers (nm) and optionally exhibit a multimodal particle size distribution. In some embodiments, the surface modified silica nanoparticles are also surface-modified by reaction with a second surface-modifying compound comprising a silane functional group and having a molecular weight of less than 800, more typically less than 500, and more typically less than 350. Typically the second surface-modifying compound comprises no polyol segment. In some embodiments, the polyurethane comprises an acrylate component capable of radiation-induced crosslinking.

In another aspect, the present disclosure provides a method comprising the steps of: a) mixing precursor for a polyurethane nanocomposite with a isocyanate polyurethane precursor to make a reactive mixture; b) applying the reactive mixture to a substrate; and c) curing the reactive mixture.

DETAILED DESCRIPTION

The present disclosure provides polyurethane nanocomposites wherein surface modified silica nanoparticles are covalently bound into the elastomeric polyurethane backbone. The surface treatment allows the nanosilica to be well dispersed and bound in the polyurethane matrix. The surface treatment enables unusually high loadings of nanosilica, in some embodiments without a large increase in viscosity. The surface treatment enables bulk polymerization of the polyurethane nanocomposite.

The present disclosure additionally provides films comprising the polyurethane nanocomposites of the present disclosure. The present disclosure additionally provides methods of using such films as erosion resistant covering layers or coatings, such as may be used on leading edges of helicopter rotor blades, wind turbine blades, fixed wing aircraft, or the like.

Any suitable polyurethane may be used in the practice of the present disclosure. In some embodiments, the polyurethane comprises an acrylate component. In some embodiments, the polyurethane comprises an acrylate component capable of crosslinking. In some embodiments, the polyurethane comprises an acrylate component capable of radiation-induced crosslinking with application of ebeam or EM radiation such as UV radiation. In some embodiments, the polyurethane comprises no acrylate component. In some embodiments, the polyurethane is a mixed polyurethane/polyurea. In some embodiments, the polyurethane is not a polyurea nor a mixed polyurethane/polyurea.

Any suitable silica nanoparticles may be used in the practice of the present disclosure. In some embodiments, silicas useful in manufacture of the materials of this disclosure are commercially available from Nalco Chemical Co. (Naperville, Ill.) under the product designation NALCO COLLOIDAL SILICAS. Such silicas may include NALCO products 1040, 1042, 1050, 1060, 2327 and 2329. In some embodiments the surface modified silica nanoparticles incorporate silane compounds. In some embodiments the silica nanoparticles are not clay nanosilicates. In some embodiments, the silica nanoparticles have a number average particle size of between 5 and 500 nanometers (nm), and in some embodiments, between 10 and 200 nm. In some embodiments, the silica particles used exhibit a multimodal size distribution as described in U.S. Provisional Pat. App. 61/303,406, the disclosure of which is incorporated herein by reference. In addition the disclosure of U.S. Pat. No. 5,648,407 is incorporated herein by reference.

Any suitable amount of silica may be included in the polyurethane nanocomposites of the present disclosure. In some embodiments, the silica content is between 1% and 90% by weight. In some embodiments, the silica content is between 1% and 65% by weight. In some embodiments, the silica content is between 1% and 50% by weight. In some embodiments, the silica content is between 3% and 35% by weight. In some embodiments, the silica content is between 3% and 90% by weight. In some embodiments, the silica content is between 3% and 65% by weight. In some embodiments, the silica content is between 3% and 50% by weight. In some embodiments, the silica content is between 5% and 35% by weight. In some embodiments, the silica content is between 5% and 90% by weight. In some embodiments, the silica content is between 5% and 65% by weight. In some embodiments, the silica content is between 5% and 50% by weight. In some embodiments, the silica content is between 8% and 35% by weight. In some embodiments, the silica content is between 8% and 90% by weight. In some embodiments, the silica content is between 8% and 65% by weight. In some embodiments, the silica content is between 8% and 50% by weight. In some embodiments, the silica content is between 8% and 35% by weight. In some embodiments, the silica content is between 12% and 90% by weight. In some embodiments, the silica content is between 12% and 65% by weight. In some embodiments, the silica content is between 12% and 50% by weight. In some embodiments, the silica content is between 15% and 35% by weight. In some embodiments, the silica content is between 15% and 90% by weight. In some embodiments, the silica content is between 15% and 65% by weight. In some embodiments, the silica content is between 15% and 50% by weight. In some embodiments, the silica content is between 15% and 35% by weight. In some embodiments, the silica content is between 18% and 90% by weight. In some embodiments, the silica content is between 18% and 65% by weight. In some embodiments, the silica content is between 18% and 50% by weight. In some embodiments, the silica content is between 18% and 35% by weight. In some embodiments, the silica content is between 21% and 90% by weight. In some embodiments, the silica content is between 21% and 65% by weight. In some embodiments, the silica content is between 21% and 50% by weight. In some embodiments, the silica content is between 21% and 35% by weight. In some embodiments, the silica content is between 25% and 90% by weight. In some embodiments, the silica content is between 25% and 65% by weight. In some embodiments, the silica content is between 25% and 50% by weight. In some embodiments, the silica content is between 25% and 35% by weight. In some embodiments, the silica content is between 30% and 90% by weight. In some embodiments, the silica content is between 30% and 65% by weight. In some embodiments, the silica content is between 30% and 50% by weight. In some embodiments, the silica content is between 30% and 35% by weight.

The silica nanoparticles may be surface modified by reaction with surface-modifying compounds having one or more functional groups capable of covalently bonding to silica and one or more functional groups capable of incorporation into a polyurethane polymer, thus providing covalent bonding of the silica particles to the polyurethane polymer. Most typically, the functional groups capable of covalently bonding to silica are silane groups. Most typically, the functional groups capable of incorporation into a polyurethane polymer are hydroxy groups, but may also be amine groups. In some embodiments, the surface-modifying compound additionally aids in dispersal of the silica nanoparticles in one component of the polyurethane prior to polymerization, typically the polyol component. In some embodiments, the surface-modifying compound is a polyol comprising a silane group. In some embodiments, the surface-modifying compound is a polyol to which a silane group is added by reaction with a compound comprising a silane (or silane-generating) group and an isocyanate group. The polyol that forms a part of the surface-modifying compound may be the same or different as a polyol used in the polyurethane. In some embodiments, the polyol that forms a part of the surface-modifying compound is different from the polyol used in the polyurethane. In some embodiments, at least one polyol that forms a part of the surface-modifying compound is the same as at least one polyol used in the polyurethane. In some embodiments, the polyol or polyols that form a part of the surface-modifying compound are the same as at least some of the polyols used in the polyurethane. In some embodiments, the polyol or polyols used in the polyurethane are the same as at least some of the polyols that form a part of the surface-modifying compound. In some embodiments, the polyol or polyols that form a part of the surface-modifying compound are the same as the polyol or polyols used in the polyurethane. In some embodiments, the polyol that forms a part of the surface-modifying compound has a MW of at least 100, more typically at least 200, more typically at least 500, and most typically at least 800. In some embodiments, an additional silane may be added to occupy additional binding sites on the silica particle. In some such embodiments, the additional silane may have a molecular weight of less than 800, more typically less than 500, more typically less than 350, and more typically less than 250. In some such embodiments, the additional silane comprises no polyol segment.

In various embodiments, the polyurethane nanocomposite materials may be applied as a sheet, tape, boot, co-curable film layer, or a spray. In some embodiments, the polyurethane nanocomposite materials may be applied as a reactive mixture by mixing a the polyol polyurethane precursor having dispersed therein surface modified silica nanoparticles with a isocyanate polyurethane precursor and applying by spraying, brushing, immersion or the like, followed by cure. In some embodiments, cured polyurethane nanocomposite materials may be applied in the form of sheets, tapes, boots, or the like, with or without adhesive layers such as pressure sensitive adhesives or curable adhesives. In some embodiments, the polyurethane nanocomposite may be used as erosion resistant covering layers or coatings. In some embodiments, the polyurethane nanocomposite may be used as erosion resistant covering layers or coatings on leading edges of helicopter rotor blades, wind turbine blades or fixed wing aircraft.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Sigma-Aldrich Company, St. Louis, Mo., or may be synthesized by known methods. Unless otherwise reported, all ratios are by weight percent.

The following abbreviations are used to describe the examples:
° F.: Degrees Fahrenheit
° C.: Degrees Centigrade
mil: $10^{-3}$ inches
µm: micrometers
mm: millimeters
cm: centimeters kg kilograms
kPa: kilopascals
psi: pounds per square inch
mg: milligrams BDO refers to 1,4-butanediol, obtained from Alfa Aesar, Ward Hill, Mass.

DBTDL refers to dibutyltin dilaurate, obtained under the trade designation "DABCO T-12" from Air Products & Chemicals, Inc., Allentown, Pa.

IPDI refers to isophorone diisocyanate, obtained under the trade designation "VESTANAT IPDI" from Evonik Industries, Essen, Germany.

N2329 refers to an aqueous colloidal silica sol having an average particle size of 70-150 nm, received at 40.0% solids as determined by drying in a oven at 150° C. for 30 minutes, obtained under the trade designation "NALCO 2329" from Nalco Company, Naperville, Ill.

PPT 8542HS refers to a polyurethane protective tape, obtained under the trade designation "PPT 8542HS" from 3M Company, St. Paul, Minn.

PPT 8663 MB HS refers to a polyurethane protective tape, obtained under the trade designation "PPT 8663MB HS" from 3M Company.

PPT 8671HS refers to a polyurethane protective tape, obtained under the trade designation "PPT 8671HS" from 3M Company.

PTMEG refers to polytetramethylene ether glycol, having an average molecular weight of 1,000, obtained under the trade designation "TERATHANE 1000" from Invista S. ar. L., Wichita, Kans.

TEPS refers to n-triethoxypropylsilane, obtained from Sigma-Aldrich Company, St. Louis, Mo.

TESPI refers to 3-triethoxysilylpropyylisocyanate, obtained from Sigma-Aldrich Company.

TONE 2221 refers to a low-viscosity, linear polycaprolactone polyol, obtained under the trade designation "TONE 2221" from Dow Chemical Company, Midland, Mich.

TX10693 refers to an aqueous 90 nm silica sol, received at 32.5% solids as determined by drying in a oven at 150° C. for 30 min, obtained under the trade designation "TX10693" from Nalco Company, Naperville, Ill.

Thermogravimetric Analysis (TGA)

The silica content of the following silica-silane dispersions was measured by TGA. A sample of approximately 20 mg of the dispersion was placed in a platinum TGA pan. The pan was loaded into a thermogravimetric analyzer, model "Q500" from TA Instruments, Inc., New Castle, Del., and ramped from 30° C. to 900° C. at a rate of 20° C./minute in an air purge. The weight percent of incombustible material remaining is reported as the weight percent of total silica in the silica-silane dispersion.

Silica-Silane Dispersion:

80 grams PTMEG was dissolved in 35 grams dry ethyl acetate at 70° F. (21.1° C.), to which 9.9 grams TESPI was slowly added. Four drops of DBTDL was then added and the temperature kept below 40° C. while continuing to stir the mixture for 16 hours. Residual ethyl acetate was then removed by vacuum distillation using a Buchi rotoevaporator set in an oil bath at 65° C. The silane equivalent weight of the mixture was calculated to be 2250 g/mol. A pre-mix was then prepared by mixing 57.1 grams of the silane mixture with 1,500 grams 1-methoxy-2-propanol and 1.75 grams TEPS.

750 grams TX10693 was added to a 3-necked flask equipped with overhead stirrer, thermometer and condenser. While stirring, the premix was slowly added over a period of 10 minutes and the mixture held between 90-95° C. for 20 hours. After cooling the mixture was poured into an aluminum foil pan and dried at 70° F. (21.1° C.) for 48 hours. The silica content of the resultant white silica-silane powder was determined to be 85.5% by weight with TGA.

290 grams of the dried silica-silane powder was dispersed in 1,000 grams of a 50:50 by weight acetone:tetrahydrofuran mixture for 90 seconds at 70° F. (21.1° C.) using a high speed shear mixer set at 75% power, model "L4R", obtained from Silverson Machines, Inc., East Longmeadow, Mass. After standing for 10 minutes, the dispersion was filtered through a 100 µm nylon mesh, obtained under the trade designation "SPECTRA MESH 100 µm WOVEN FILTER" from Spectrum Laboratories, Inc., Rancho Domenguez, Calif. The silica-silane content of the dispersion was measured and found to be 23.5% by weight by drying in an oven at 150° C. for 30 minutes.

1,000 grams of the silica-silane dispersion was mixed with 340 grams PTMEG then stripped in the Buchi rotoevaporator for approximately 90 minutes at 65° C., then for 30 minutes at 120° C. The silica % solids was determined to be 39.0% by weight as measured by TGA.

Polyurethane Films:

Examples of the polyurethane film of the present disclosure, and comparative formulations, were prepared as follows according to the compositions listed in Table 1. PTMEG, the silica-silane dispersion, and BDO were mixed in a 50 ml. polyethylene beaker then dried in a vacuum oven for 3 hours at 70° C. and 0.97 atmospheres pressure (98.3 kPa) to remove any traces of water. IPDI was added, followed by DBTDL, mixed until homogeneous, then cast to a thickness of 12 mil (304.8 µm) between two 3-mil (7.26 µm) thick polyethylene release liners and cured for 2 hours at 70° C. The polyethylene liners were removed from the resultant polyurethane film, silicone coated paper liners were applied, and the film repressed to 20 mil (508 µm) in a hot press, model number "50-2424-2TM" from Wabash Metal Products, Inc., Wabash, Ind., at 120° C.

TABLE 1

| Sample | Silica-Silane Dispersion (g) | PTMEG (g) | BDO (g) | IPDI (g) | DBTDL (g) | Silica (wt %) |
| --- | --- | --- | --- | --- | --- | --- |
| Comp. A | 0 | 15.0 | 0.60 | 5.01 | 0.10 | 0 |
| Comp. B | 0 | 14.0 | 0.80 | 5.29 | 0.10 | 0 |
| Comp. C | 0 | 13.5 | 1.31 | 6.48 | 0.13 | 0 |
| Comp. D | 0 | 13.0 | 1.50 | 6.85 | 0.13 | 0 |
| Ex. 1 | 12.0 | 8.0 | 0.60 | 5.23 | 0.13 | 18% |
| Ex. 2 | 20.0 | 0 | 0.20 | 3.28 | 0.12 | 33% |

Sand Erosion Test:

A 3 by 2.67 inch (7.62 by 6.78 cm) sample of a polyurethane film prepared above was laminated to an adhesive transfer film, obtained under the trade designation "965 Adhesive Transfer Film", from 3M Company, and applied to a 3 by 2.67 inch (7.62 by 6.78 cm) aluminum panel. After recording the initial mass, the panel was then attached to an aluminum plate set 3 inches (7.62 cm), and at an angle of 30 degrees, to a sand blast gun, model number "SBC 420", from Altas Handling Systems, LLC. Two kg of aluminum oxide, obtained under the trade designation "46 GRIT BLAST MEDIA" from Grainger, Lake Forest, Ill., was fired at the test sample at a pressure of 70 psi (482.6 kPa) for approximately 2 minutes, after which the panel was removed and reweighed. Each sample was tested four times. The cumulative mass eroded, and the corresponding cumulative volume eroded (based on a silica density of 2.1 grams/cm³), are reported in Table 2.

TABLE 2

| Sample | Calculated Density | Cumulated Mass Eroded (mg) | Cumulative Volume Eroded (cm³) |
|---|---|---|---|
| Comparative A | 1.1 | 18.2 | 0.063 |
| Comparative B | 1.1 | 16.2 | 0.059 |
| Comparative C | 1.1 | 21.6 | 0.071 |
| Comparative D | 1.1 | 31.1 | 0.095 |
| Example 1 | 1.28 | 18.5 | 0.053 |
| Example 2 | 1.43 | 14.3 | 0.036 |
| PPT 8542HS* | 1.1 | 32.7 | 0.110 |
| PPT 8663MB HS* | 1.1 | >93.1 Sample eroded through | 0.240 |
| PPT 8671HS | 1.1 | 85.2 | 0.243 |

*Average of 2 samples

As evident in the sand erosion results, the addition of the surface-modified nanosilica into the polyurethane formulation results in less volume loss compared to samples without surface-modified nanosilica. Because it loses less volume, it will take more erodent to wear through a sample containing surface-modified nanosilica, resulting in a film or coating with a longer in-service life.

Example 3

A further silica-silane dispersion was prepared as follows.
A. 80 grams of Tone 2221 Polyol (DOW Chemical) was placed in 25 grams of ethyl acetate and mixed well. A magnetic stir bar was added and while stirring at room temperature, 9.9 grams of 3-triethoysilylpropylisocyanate was slowly added followed by 4 drops of tin(di-n-butyldilaurate) (Alfa Aesar Lot FO9N01). The initial exotherm was controlled by use of a water bath. The solution was then stirred overnight and ethyl acetate was removed using a Buchi rotovap with an oil bath set at 60-65° C. The silane equivalent weight of the mixture was calculated to be 2250 g/mol.
B. 150 grams of an aqueous solution of ion exchanged Nalco 2329 colloidal silica (Lot BP6C0673A2, 40% silica by weight measured by drying in an oven at 150° C. for 30 minutes) was placed in a 3 necked flask equipped with overhead stirrer, thermo watch, thermometer and condenser. While stirring at room temperature, 75 grams of 1-methoxy-2-propanol was added, followed quickly by enough concentrated aqueous ammonium hydroxide to quickly bring the pH to between 9-9.5. When solution remained homogeneous and fluid, a premix of 155 grams of methoxypropanol, 13.2 grams of the silane mixture prepared in A and 0.4 grams of triethoxypropylsilane was added and the solution reacted 90-95° C. for 20 hours. The resulting solution was poured into a foil pan and air dried at room temperature to a white powder. Silica residue of the particle was determined by TGA to be 81.0%.
C. 18 grams of the material prepared in B was added to 50 grams of acetone and high shear mixed using a Silverston (¾ speed for one minute), then filtered through a 53u nylon mesh. Measured (by drying in an oven at 150° C. for 30 minutes) silica/silane solids were 27.5% and silica solids were calculated to be 22.2%.
D. 85 grams of the material prepared in C were placed in 35 grams of Tone 2221, mixed well and then stripped using a Buchi rotovap and an oil bath set at 65° C. to remove volatiles. Final silica solids were 34.7% by weight as measured by TGA.

The silica-silane dispersion of Example 3 may be used as discussed above.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:
1. A method comprising the steps of:
  a) mixing precursor for a polyurethane nanocomposite with an isocyanate polyurethane precursor to make a reactive mixture;
  b) applying the reactive mixture to a substrate; and
  c) curing the reactive mixture;
wherein the precursor for a polyurethane nanocomposite comprises:
  x) a first polyol, and
  y) surface modified silica nanoparticles dispersed within the first polyol, where said nanoparticles are surface-modified by reaction with a surface-modifying compound comprising a second polyol to which a silane group is added by reaction with a compound comprising a silane or silane-generating group and an isocyanate group, wherein the reaction with the compound comprising the silane or silane-generating group and the isocyanate group occurs prior to making the reactive mixture in step a).

2. The method according to claim 1 wherein the precursor for a polyurethane nanocomposite has a silica content of greater than 18% by weight.

3. The method according to claim 1 wherein the precursor for a polyurethane nanocomposite has a silica content of greater than 30% by weight.

4. The method according to claim 1 wherein the precursor for a polyurethane nanocomposite has a silica content of greater than 50% by weight.

5. The method according to claim 4 wherein the silica nanoparticles are surface-modified by reaction with a surface-modifying compound comprising the silane group and a polyol segment derived from the second polyol.

6. The method according to claim 4 wherein the second polyol has a molecular weight of at least 500.

7. The method according to claim 4 wherein the second polyol is the same polyol as the first polyol.

8. The method according to claim 4 wherein the second polyol is essentially the same polyol as the first polyol.

9. The method according to claim 4 wherein the surface modified silica nanoparticles have a number average particle size of between 5 and 500 nanometers (nm).

10. The method according to claim 4 wherein the surface modified silica nanoparticles exhibit a multimodal particle size distribution.

11. The method according to claim 1 wherein the silica nanoparticles are surface-modified by reaction with the surface-modifying compound comprising the silane group and a polyol segment derived from the second polyol.

12. The method according to claim 1 wherein the second polyol has a molecular weight of at least 500.

13. The method according to claim 1 wherein the second polyol is the same polyol as the first polyol.

14. The method according to claim 1 wherein the second polyol is essentially the same polyol as the first polyol.

15. The method according to claim 1 wherein the surface modified silica nanoparticles have a number average particle size of between 5 and 500 nanometers (nm).

16. The method according to claim 1 wherein the surface modified silica nanoparticles exhibit a multimodal particle size distribution.

17. The method according to claim 1 wherein the surface modified silica nanoparticles are surface-modified by reaction with a second surface-modifying compound comprising a silane group and having a molecular weight of less than 350.

18. The method according to claim 17 wherein said second surface-modifying compound comprises no polyol segment.

19. The method according to claim 1 wherein said polyurethane nanocomposite comprises an acrylate component capable of radiation-induced crosslinking.

* * * * *